US012644322B2

(12) United States Patent
Jung et al.

(10) Patent No.: US 12,644,322 B2
(45) Date of Patent: Jun. 2, 2026

(54) VEHICLE DOOR HINGE APPARATUS

(71) Applicants: HYUNDAI MOTOR COMPANY, Seoul (KR); KIA CORPORATION, Seoul (KR)

(72) Inventors: Doo Young Jung, Suwon-si (KR); Ki Hyun Choi, Yongin-si (KR); Hyung Sik Choi, Seoul (KR); Sang Heon Lee, Seoul (KR); Woo Sik Yoon, Incheon (KR); Min Su Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/652,337

(22) Filed: May 1, 2024

(65) Prior Publication Data

US 2025/0172025 A1 May 29, 2025

(30) Foreign Application Priority Data

Nov. 24, 2023 (KR) ........................ 10-2023-0165663

(51) Int. Cl.
*E05D 3/18* (2006.01)
*E05F 15/00* (2015.01)

(52) U.S. Cl.
CPC .............. *E05D 3/186* (2013.01); *E05F 15/00* (2013.01); *E05Y 2201/71* (2013.01); *E05Y 2900/531* (2013.01)

(58) Field of Classification Search
CPC ............................... E05D 3/186; E05F 15/614
See application file for complete search history.

(56) References Cited

U.S. PATENT DOCUMENTS

| | | | | |
|---|---|---|---|---|
| 1,619,502 A * | 3/1927 | Fox | E05D 3/186 5/57.1 |
| 2,045,955 A * | 6/1936 | Lefevre | E05D 3/186 16/358 |
| 2,227,849 A * | 1/1941 | Soss | E05D 3/186 16/359 |
| 6,829,808 B2 * | 12/2004 | Neukotter | E05D 3/186 16/366 |

(Continued)

FOREIGN PATENT DOCUMENTS

| | | | | |
|---|---|---|---|---|
| EP | 937852 A2 * | 8/1999 | E05D 15/264 |
| EP | 2781676 A1 * | 9/2014 | E05D 11/1014 |

*Primary Examiner* — Marcus Menezes
(74) *Attorney, Agent, or Firm* — MCDONNELL BOEHNEN HULBERT & BERGHOFF LLP

(57) ABSTRACT

A vehicle door hinge apparatus including a door link having one end pivotably and slidably connected to a vehicle body side and the other end hinged to a door side, a vehicle body link having one end pivotably and slidably connected to the door side and the other end hinged to the vehicle body side, a door link guide provided on the vehicle body side and configured to guide sliding of the one end of the door link, and a vehicle body link guide provided on the door side and configured to guide sliding of the one end of the vehicle body link. The door link and the vehicle body link intersect each other, an intersection point of the two links is hinged, and the door link and the vehicle body link perform, when the door is opened, a scissors motion around the hinged intersection point.

12 Claims, 11 Drawing Sheets

(56) References Cited

U.S. PATENT DOCUMENTS

| | | | | |
|---|---|---|---|---|
| 11,788,331 | B2 * | 10/2023 | Tsuruoka | E05F 1/1284 16/357 |
| 2007/0294860 | A1 * | 12/2007 | Hoffman | E05D 5/0207 16/368 |
| 2020/0256099 | A1 * | 8/2020 | Lin | E05D 7/0009 |

* cited by examiner 550 (550a, 550b)

550 (550a, 550b)

VEHICLE DOOR HINGE APPARATUS

CROSS REFERENCE TO RELATED APPLICATIONS

This application claims priority from Korean Patent Application No. 10-2023-0165663, filed on Nov. 24, 2023, in the Korean Intellectual Property Office, the disclosure of which is incorporated herein by reference in its entirety.

BACKGROUND

1. Field

The present disclosure relates to a vehicle door hinge apparatus.

2. Description of the Related Art

In general, a vehicle door distinguishes the interior of a vehicle from the exterior thereof. The vehicle door has a function of blocking external noise, rain, dust, wind, and the like. Further, in the event of vehicle side collision, the vehicle door plays an important role in protecting an occupant by absorbing impact from the outside together with a vehicle side structure.

There are various types of vehicle doors including a special purpose door and the like. Generally, hinged swing doors are applied to passenger vehicles. Here, a swing door refers to a door that opens toward the outside of a vehicle body around a hinge shaft installed between the swing door and the vehicle body. A swing door is easy to open and close, and a simple structure thereof enables a user to easily maintain and repair the swing door.

Meanwhile, interest in electric vehicles and autonomous vehicles has recently increased, and various types of vehicles have been developed for various purposes. In the case of autonomous vehicles, the interior space of the vehicle is designed to enable a passenger to move freely therein, and connectivity performance of autonomous vehicles has been improved to be connected to various other environments.

For example, the vehicle door may be used to connect a vehicle to various other spaces. Further, the vehicle door may not only function as a gate but also have a function of maximizing a feeling of openness in the vehicle. In order to secure a feeling of openness of the vehicle door, the vehicle door may be connected to a vehicle body from the outside. In this case, since a door hinge is exposed to the outside, deterioration in vehicle exterior design may occur when the vehicle is connected to various other spaces. Additionally, since the door hinge is exposed to the outside, contaminants may flow into the interior of the vehicle from the outside through an opening caused by the door hinge.

In order to solve the above-described problems, it is necessary to apply a door hinge having a structure different from that of a conventional door hinge to a vehicle door that connects a vehicle to various spaces.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a vehicle door hinge apparatus capable of maximizing an open feeling when a door hinge is not exposed to the outside.

The objects of the present disclosure are not limited to the above-mentioned object, and other objects not yet mentioned will be clearly understood by those of ordinary skill in the art to which the present disclosure pertains from the following description.

In accordance with the present disclosure, the above and other objects can be accomplished by the provision of a vehicle door hinge apparatus including a door link having one end pivotably and slidably connected to a vehicle body side and the other end hinged to a door side, a vehicle body link having one end pivotably and slidably connected to the door side and the other end hinged to the vehicle body side, a door link guide provided on the vehicle body side and configured to guide sliding of the one end of the door link, and a vehicle body link guide provided on the door side and configured to guide sliding of the one end of the vehicle body link, wherein the door link and the vehicle body link intersect each other, an intersection point of the two links is hinged, and the door link and the vehicle body link perform, when the door is opened, a scissors motion around the hinged intersection point.

The door link and the vehicle body link may intersect each other so as to partially overlap each other in a vertical direction, and the intersection point of the two links may be hinged by a pin configured to penetrate the door link and the vehicle body link in the vertical direction.

The other end of the door link and the other end of the vehicle body link may be disposed to face each other and to be adjacent to each other, and the one end of the door link and the one end of the vehicle body link may be disposed to be spaced apart from each other in opposite directions.

The door link may include a link body and bent portions respectively bent at opposite ends of the link body, an end of the bent portion on one side of the door link may be pivotally and slidably connected to the vehicle body side, and an end of the bent portion on the other side of the door link may be hinged to the door side.

The other end of the door link may be disposed to be further biased toward an outside of a vehicle than the one end of the door link such that the link body of the door link is obliquely disposed.

The vehicle body link may include a link body and bent portions respectively bent at opposite ends of the link body, an end of the bent portion on one side of the vehicle body link may be pivotably and slidably connected to the door side, and an end of the bent portion on the other side of the vehicle body link may be hinged to the vehicle body side.

The other end of the vehicle body link may be disposed to be further biased toward an outside of a vehicle than the one end of the vehicle body link such that the link body of the vehicle body link is obliquely disposed.

Each of the door link guide and the vehicle body link guide may have a sliding groove formed therein, wherein the sliding groove may be formed to extend in a forward-and-rearward direction of a vehicle in a closed state of the door.

In the closed state of the door, the one end of the door link may be located at a front portion of the sliding groove, and the one end of the vehicle body link may be located at a rear portion of the sliding groove.

In an opened state of the door, the one end of the door link may slide from the front portion of the sliding groove to a rear portion thereof along the sliding groove, and the one end of the vehicle body link may slide from the rear portion of the sliding groove to a front portion thereof along the sliding groove.

In a fully opened state of the door, the one end and the other end of the door link or the one end and the other end of the vehicle body link may be located on the same line, each of the door link and the vehicle body link may include a link body, and the link body of the door link and the link body of the vehicle body link may be located to overlap each other.

In a closed state of the door, the one end of the door link and the other end of the vehicle body link may be located on an inner side of a vehicle body, and the other end of the door link and the one end of the vehicle body link may be located on an inner side of the door such that the door link and the vehicle body link are not exposed to an outside of the vehicle body or the door.

The vehicle door hinge apparatus may further include an actuator connected to the one end of the door link and configured to move the one end of the door link so as to allow the one end of the door link to slide along the door link guide.

The actuator may include an arm and a gear, the arm of the actuator may be connected to the one end of the door link, and the gear of the actuator may be connected to the arm so as to move the arm through rotation thereof.

When an emergency situation occurs, the gear may be separated from the arm through an operation part located at an upper portion or a lower portion of the gear, and a connection between the gear and the arm may be released such that a manual operation is performable. When the emergency situation is released, the gear may be connected to the arm again through the operation part such that the manual operation is not performable.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Figure 1:
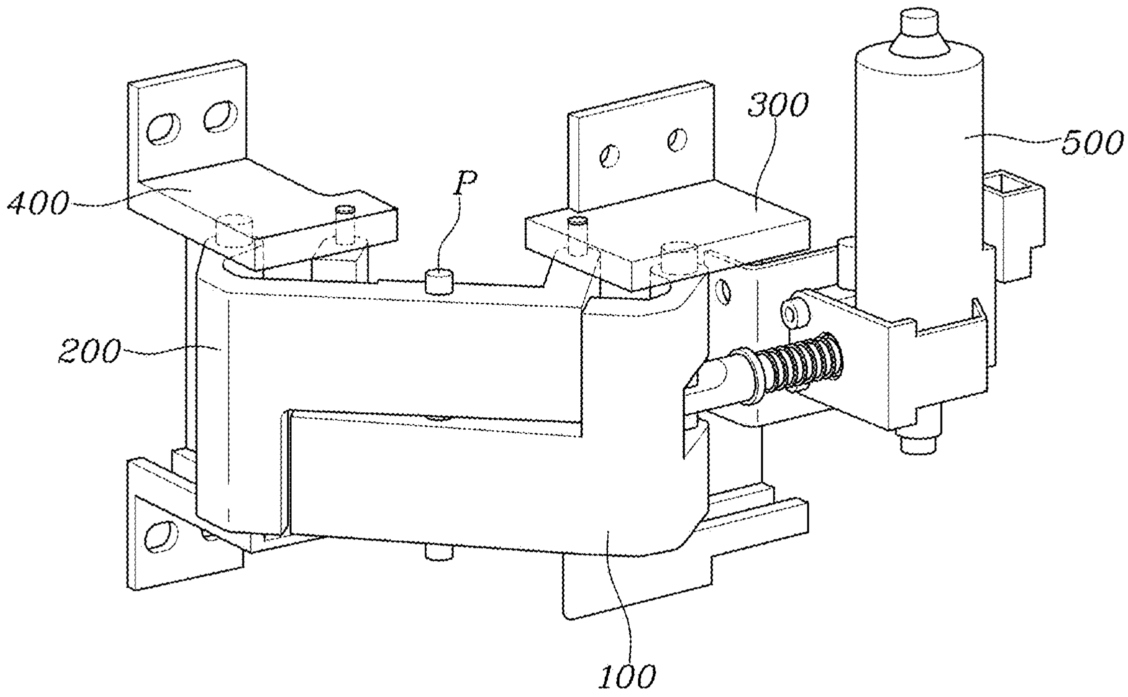
FIG. 1 is a diagram showing a vehicle door hinge apparatus according to an embodiment of the present disclosure.

In describing the embodiments disclosed herein, when it is determined that the detailed description of publicly known techniques to which the disclosure pertains may obscure the gist of the present disclosure, the detailed description will be omitted. Further, it should be understood that the accompanying drawings are merely illustrated to easily describe the embodiments disclosed in this specification, and therefore, the technical idea disclosed in this specification is not limited by the accompanying drawings. Further, it should be noted that the accompanying drawings include all modifications, equivalents, and substitutes that fall within the spirit and technical scope of the present disclosure.

Meanwhile, in the present disclosure, terms such as "first" and/or "second" may be used to describe various components, but the components are not limited by the terms. The terms are used only for the purpose of distinguishing one component from other components.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween.

In this specification, an expression in a singular form also includes the plural sense, unless clearly specified otherwise in context.

It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Hereinafter, embodiments will be described in detail with reference to the accompanying drawings. In describing the embodiments with reference to the accompanying drawings, the same or corresponding components are denoted by the same reference numerals and overlapping descriptions thereof will be omitted.

First, a vehicle door hinge apparatus according to an embodiment of the present disclosure will be described with reference to FIG. 1.

FIG. 1 is a diagram illustrating a vehicle door hinge apparatus according to an embodiment of the present disclosure.

Referring to FIG. 1, the vehicle door hinge apparatus according to the embodiment of the present disclosure may include a door link 100, a vehicle body link 200, a door link guide 300, and a vehicle body link guide 400. FIG. 1 is a diagram showing only components related to the embodiment of the present disclosure. Of course, when an actual door hinge apparatus is implemented, fewer or more components may be included.

Hereinafter, each component will be described.

One end of the door link 100 may be pivotably and slidably connected to the vehicle body side, and the other end thereof may be hinged to the door side. Correspondingly, one end of the vehicle body link 200 may be pivotably and slidably connected to the door side, and the other end thereof may be hinged to the vehicle body side.

The door link guide 300 may be provided on the vehicle body side and may guide sliding of one end of the door link 100. To this end, the door link 100 may have a bearing provided at one end thereof and configured to slide along the door link guide 300.

The vehicle body link guide 400 may be provided on the door side and may guide sliding of one end of the vehicle body link 200. To this end, the vehicle body link 200 may have a bearing provided at one end thereof and configured to slide along the vehicle body link guide 400.

Meanwhile, one end of the door link 100 and the other end of the vehicle body link 200 may be provided in the door link guide 300, and the other end of the door link 100 and one end of the vehicle body link 200 may be provided in the vehicle body link guide 400. However, this structural configuration is an example, and the present disclosure is not necessarily limited thereto.

Additionally, as shown in FIG. 1, the door link 100 and the vehicle body link 200 may intersect each other, and an intersection point of the two links 100 and 200 may be hinged. Accordingly, when a door is opened, the door link 100 and the vehicle body link 200 may perform a scissors motion around the hinged intersection point.

For example, the door link 100 and the vehicle body link 200 may intersect each other so as to partially overlap each other in the vertical direction, and the intersection point of the two links 100 and 200 may be hinged by a pin P penetrating the door link 100 and the vehicle body link 200 in the vertical direction.

In the vehicle door hinge apparatus according to the embodiment of the present disclosure, when the door link 100 moves first, the vehicle body link 200 may also move in conjunction with movement of the door link 100. For example, when force is applied to the door link 100, rotational force is applied to the door link 100, and rotational force applied from the door link 100 may be transmitted to the vehicle body link 200. Thereafter, the vehicle body link 200 may slide along the vehicle body link guide 400. That is, when the door link 100 and the vehicle body link 200 are operated as described above, the vehicle door may be opened at an angle of 90 degrees from a closed state thereof or may be opened at an angle of 180 degrees. However, it should be understood that this structural configuration is an example, and the present disclosure is not necessarily limited thereto.

In this case, force applied to the door link 100 may be applied by a person or through a pressing apparatus. For example, the vehicle door hinge apparatus according to the embodiment of the present disclosure may further include an actuator 500 adopted to apply force to the door link 100. The actuator 500 may be connected to one end of the door link 100, and one end of the door link 100 may be moved by the actuator 500 so that one end of the door link 100 slides along the door link guide 300. This structural configuration will be described later with reference to FIGS. 6 to 9.

Hereinafter, with reference to the configuration of the vehicle door hinge apparatus described above, an operation of the vehicle door hinge apparatus according to the embodiment of the present disclosure will be described.

Figure 2:
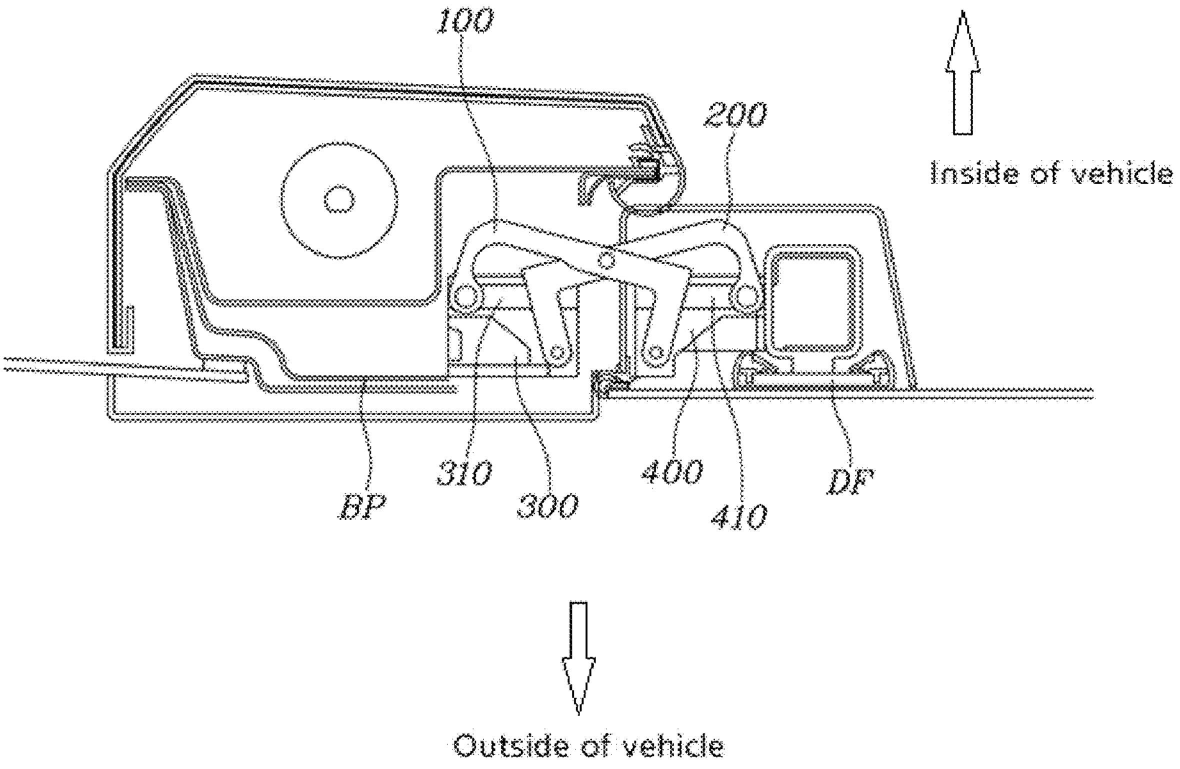
FIGS. 2, 3, and 4 are diagrams showing an operation of the vehicle door hinge apparatus according to the embodiment of the present disclosure.
Figure 3:
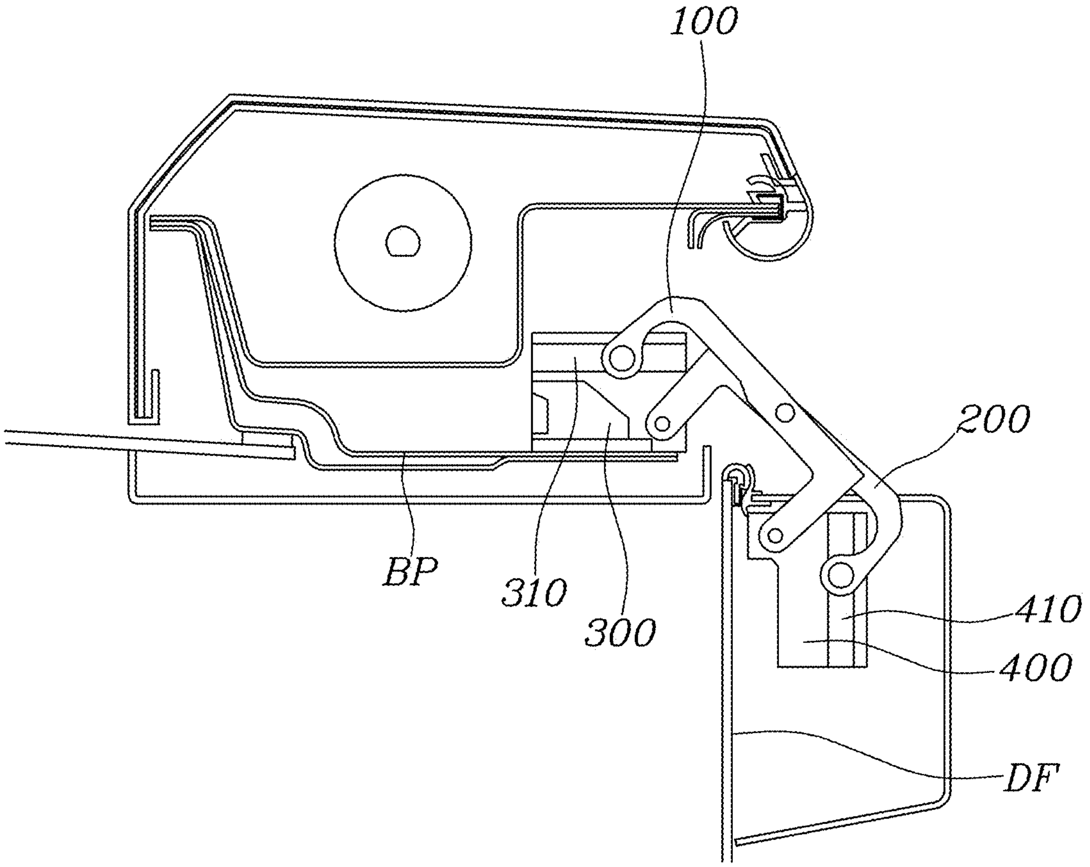
Figure 4:
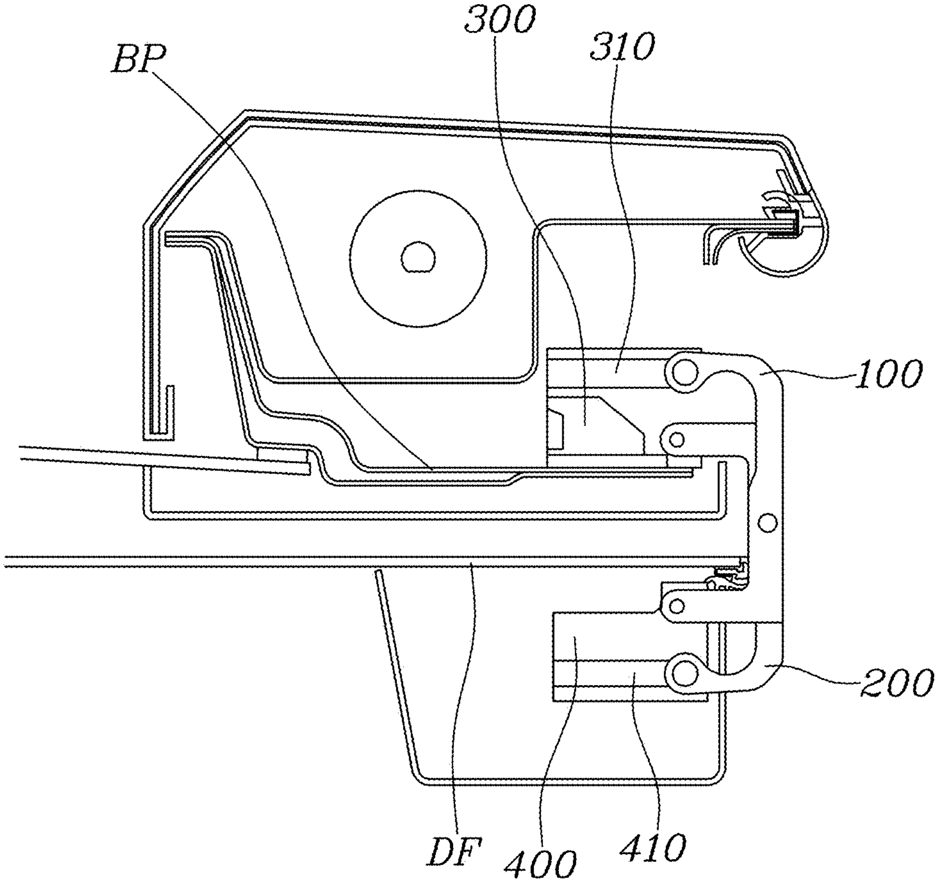

FIGS. 2 to 4 are diagrams showing the operation of the vehicle door hinge apparatus according to the embodiment of the present disclosure.

FIG. 2 is a diagram showing a closed state of a door according to the embodiment of the present disclosure, FIG. 3 is a diagram showing an opened state of a door at an angle of 90 degrees, and FIG. 4 is a diagram showing an opened state of a door at an angle of 180 degrees.

First, referring to FIG. 2, for example, the door link 100 may include a link body and bent portions respectively bent at opposite ends of the link body. Accordingly, an end of the bent portion on one side of the door link 100 may be pivotably and slidably connected to the vehicle body side, and an end of the bent portion on the other side of the door link 100 may be hinged to the door side.

In addition, the vehicle body link 200 may include a link body and bent portions respectively bent at opposite ends of the link body. An end of the bent portion on one side of the vehicle body link 200 may be pivotably and slidably connected to the door side, and an end of the bent portion on the other side of the vehicle body link 200 may be hinged to the vehicle body side.

Therefore, the other end of the door link 100 and the other end of the vehicle body link 200 may be disposed to face each other and to be adjacent to each other, and one end of the door link 100 and one end of the vehicle body link 200 may be disposed to be spaced apart from each other in opposite directions.

Here, the other end of the door link 100 may be disposed to be further biased toward the outside of the vehicle than one end of the door link 100, and the link body of the door link 100 may be obliquely disposed. Additionally, the other end of the vehicle body link 200 may be further biased toward the outside of the vehicle than one end of the vehicle body link 200, and the link body of the vehicle body link 200 may be obliquely disposed.

In this case, the link body of the door link 100 and the link body of the vehicle body link 200 may be formed to be inclined in opposite directions. For example, when the door link 100 is obliquely disposed toward a front portion of the vehicle, the vehicle body link 200 may be obliquely disposed toward a rear portion of the vehicle. However, this structural configuration is an example, and the present disclosure is not necessarily limited thereto.

Referring to FIG. 2, sliding grooves 310 and 410 may be formed in the door link guide 300 and the vehicle body link guide 400, respectively. The sliding grooves 310 and 410 may be formed to extend in the forward-and-rearward direction of a vehicle in a state in which the door is closed. For example, the sliding grooves 310 and 410 may be formed on the upper or lower surfaces of the door link guide 300 and the vehicle body link guide 400. Here, one end of the door link 100 and one end of the vehicle body link 200 may be seated in the sliding grooves 310 and 410 and may slide along the sliding grooves 310 and 410, respectively.

Referring to FIG. 2, in the state in which the door is closed, one end of the door link 100 may be located at a front portion of the sliding groove 310, and one end of the vehicle body link 200 may be located at a rear portion of the sliding groove 410.

FIG. 3 is a diagram showing a state in which the vehicle door hinge apparatus according to the embodiment of the present disclosure has an opening angle of 90 degrees by opening the door in the state shown in FIG. 2.

Referring to FIGS. 2 and 3, when the door is opened from the closed state thereof, one end of the door link 100 may slide from the front portion of the sliding groove 310 to a rear portion thereof along the sliding groove 310, and one end of the vehicle body link 200 may slide from the rear portion of the sliding groove 410 to a front portion thereof along the sliding groove 410. As a result, the link body of the door link 100 and the link body of the vehicle body link 200 may change from a state in which the two link bodies intersect each other to a state where in which the two link bodies gradually overlap each other.

FIG. 4 is a diagram showing a state in which the vehicle door hinge apparatus according to the embodiment of the present disclosure has an opening angle of 180 degrees by opening the door in the state shown in FIG. 2.

Referring to FIGS. 2 to 4, when the door is fully opened, one end of the door link 100 may be located at the rear portion of the sliding groove 310, and one end of the vehicle body link 200 may be located at the front portion of the sliding groove 410. Further, referring to FIG. 4, when the door is fully opened, one end and the other end of the door link 100 and one end and the other end of the vehicle body link 200 may be located on the same line. Accordingly, the link body of the door link 100 and the link body of the vehicle body link 200 may be located to overlap each other.

That is, through the above-described process in FIGS. 2 to 4, when the vehicle door hinge apparatus according to the embodiment of the present disclosure is used, the door may be changed from the closed state to the fully opened state, thereby completely opening the door. In this manner, it is possible to improve a feeling of openness of a vehicle using a door or other spaces connected to a vehicle.

Meanwhile, referring to FIGS. 2 to 4, the door link guide 300 and the vehicle body link guide 400 may be provided in a pillar member BP and a door frame DF of the vehicle body, respectively. Accordingly, the door link 100 and the vehicle body link 200 may also be provided in the pillar member BP and the door frame DF, respectively. For example, when the door is closed, one end of the door link 100 and the other end of the vehicle body link 200 are located on the inner side of the pillar member BP which is a vehicle body, and the other end of the door link 100 and one end of the vehicle body link 200 are located on the inner side of the door frame DF of the door. In this manner, the door link 100 and the vehicle body link 200 may not be exposed to the outside of the vehicle body and the door.

However, when the door is opened, the link body of the door link 100 and the link body of the vehicle body link 200 may be exposed to the outside. However, referring to FIG. 1, since the door link 100 and the vehicle body link 200 have planar side surfaces, the same may be formed in a stacked manner. Referring to FIG. 4, when the door is fully opened, the door link 100 and the vehicle body link 200 may overlap each other so as to be disposed on the same line.

In consideration of these points comprehensively, even if a part of the door link 100 and a part of the vehicle body link 200 are exposed to the outside, the planar side surfaces thereof may be exposed. Further, the planar side surfaces stacked in the vertical direction may form one plane when the door is fully opened. Accordingly, when the door link 100 and the vehicle body link 200 are exposed to the outside, the door link 100 and the vehicle body link 200 forming one plane are exposed to the outside instead of exposing a vehicle door hinge apparatus having a complicated structure, thereby having an effect of securing marketability of a vehicle exterior design.

Next, a description will be given with reference to FIG. 5 as to a state in which the vehicle door hinge apparatus according to the embodiment of the present disclosure is mounted on a vehicle.

Figure 5:
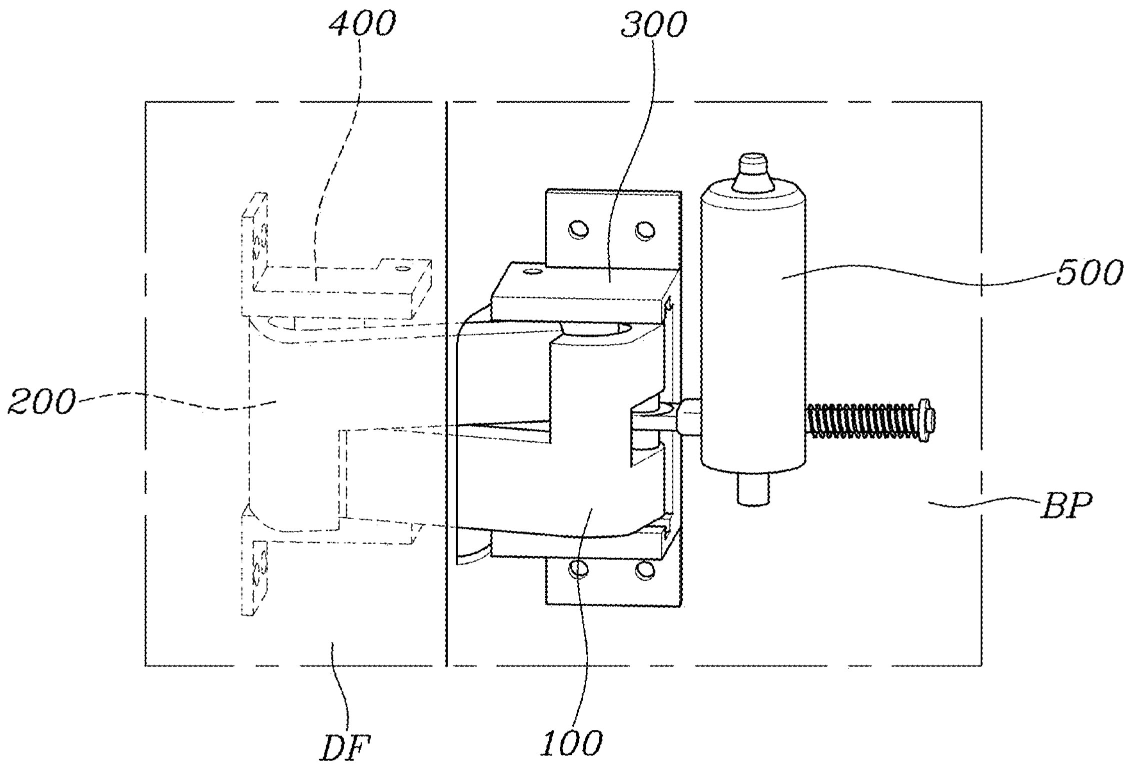
FIG. 5 is a diagram showing a state in which the vehicle door hinge apparatus according to the embodiment of the present disclosure is mounted on a vehicle.

FIG. 5 is a diagram showing a state in which the vehicle door hinge apparatus according to the embodiment of the present disclosure is mounted on a vehicle.

Referring to FIG. 5, as described above in FIGS. 2 to 4, the door link guide 300 may be provided in the vehicle body, more specifically, in the pillar body BP, and the vehicle body link guide 400 may be provided in the door, more specifically, in the door frame DF. Additionally, the actuator 500 may be fixed to the pillar body BP in the vicinity of a point at which the door link guide 300 is fixed.

For example, the door link guide 300 may be fixed to the pillar body BP by being bolted thereto in the L direction, and the vehicle body link guide 400 may be fixed to the door frame DF by being bolted thereto in the T direction. The vehicle body link guide 400 fixed to the door frame DF may be covered by a door trim (not shown) covering the door frame DF. Here, the door trim has a through hole formed therein, and the door link 100 and the vehicle body link 200 connected to the covered vehicle body link guide 400 may protrude outwards through the through hole, thereby being connected to the door link guide 300.

Meanwhile, a reinforcing bracket (not shown) adopted to reinforce strength and rigidity may be provided at each of a point at which the door link guide 300 is fixed and a point at which the vehicle body link guide 400 is fixed. In this manner, the door link guide 300 and the vehicle body link guide 400 may be fixed by the reinforcement brackets, respectively.

Hereinafter, an operation of the actuator 500 according to the embodiment of the present disclosure will be described with reference to FIGS. 6 to 8.

Figure 6:
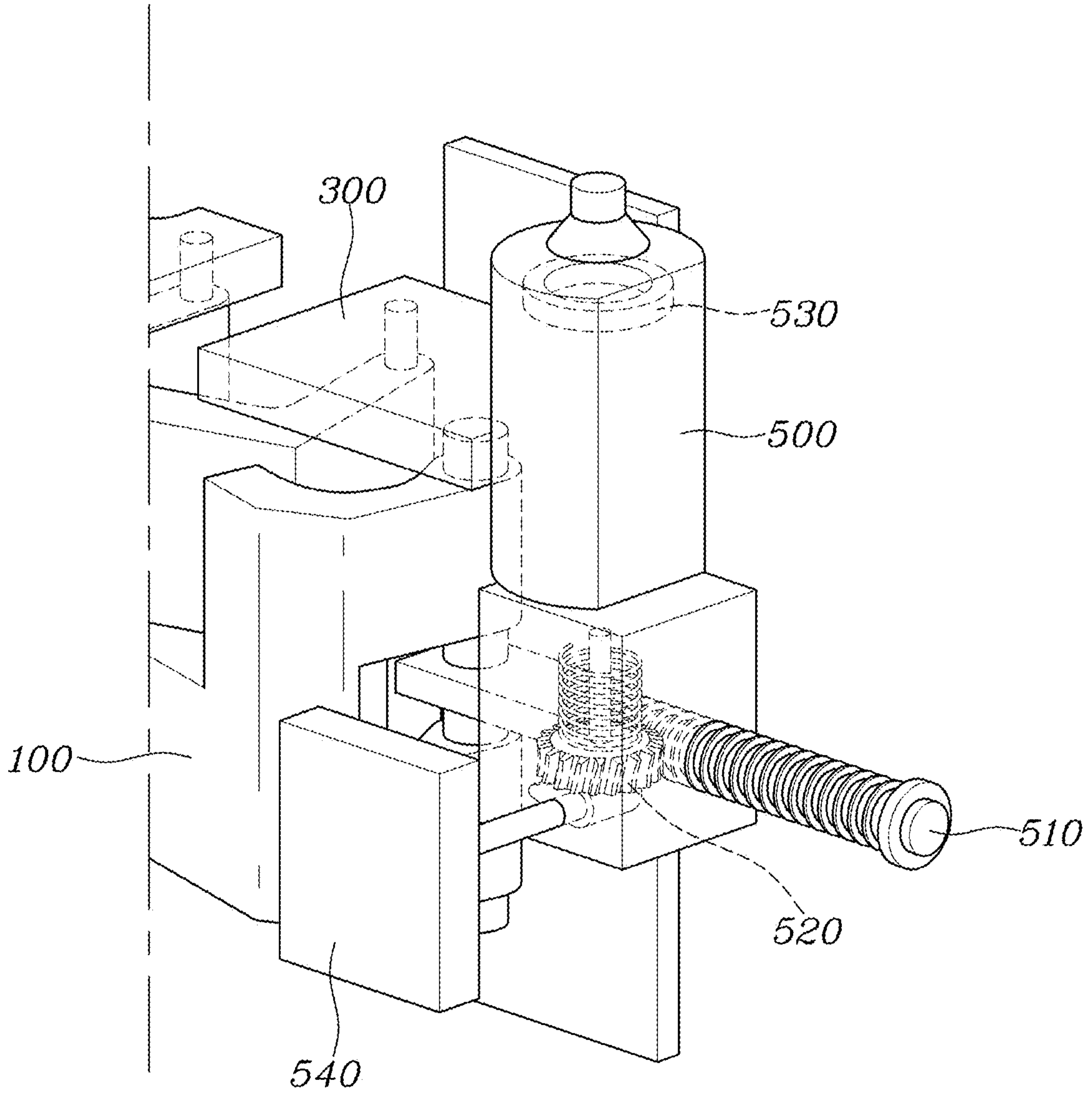
FIGS. 6, 7, and 8 are diagrams showing an operation of the vehicle door hinge apparatus using an actuator according to the embodiment of the present disclosure.
Figure 7:
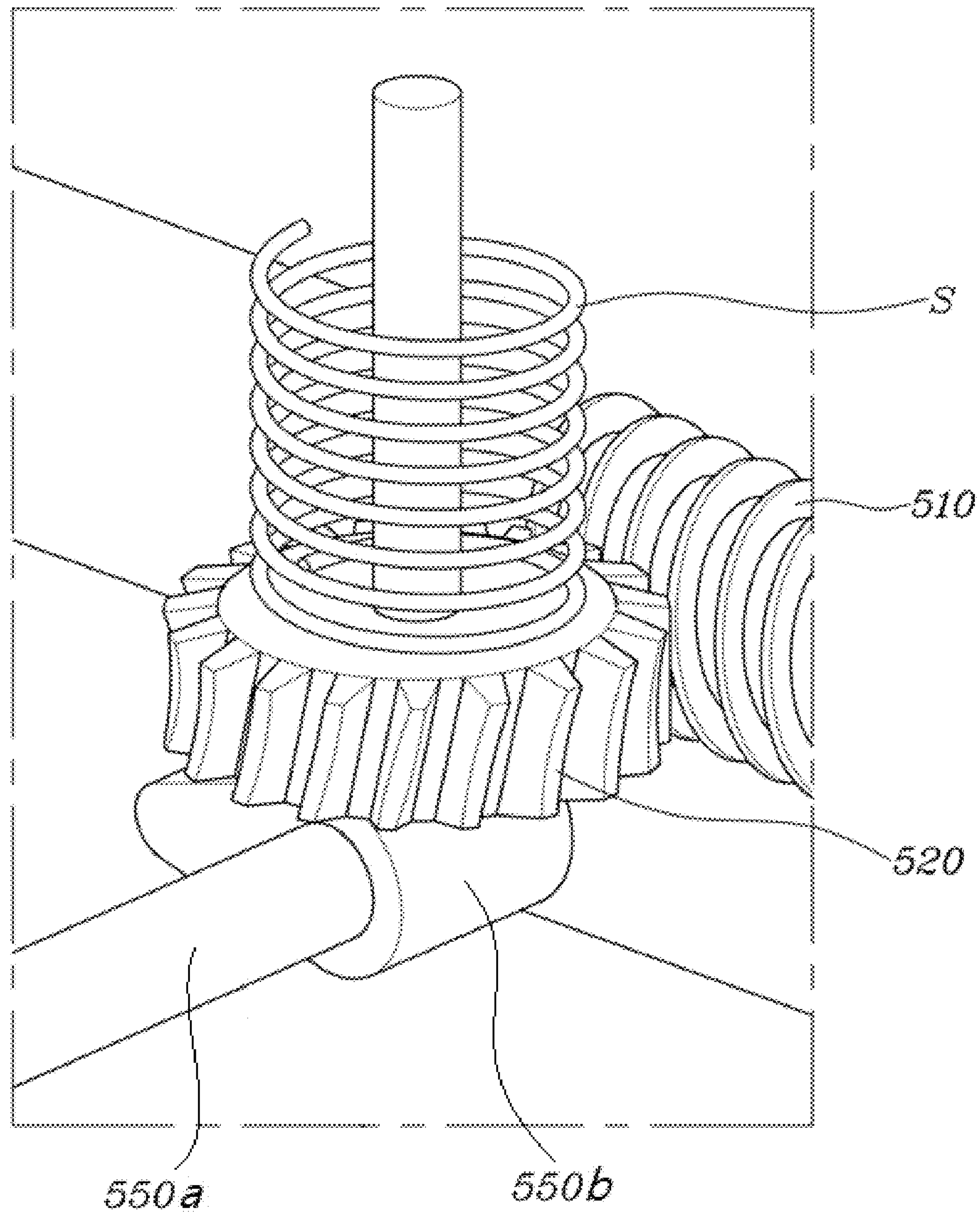
Figure 8:
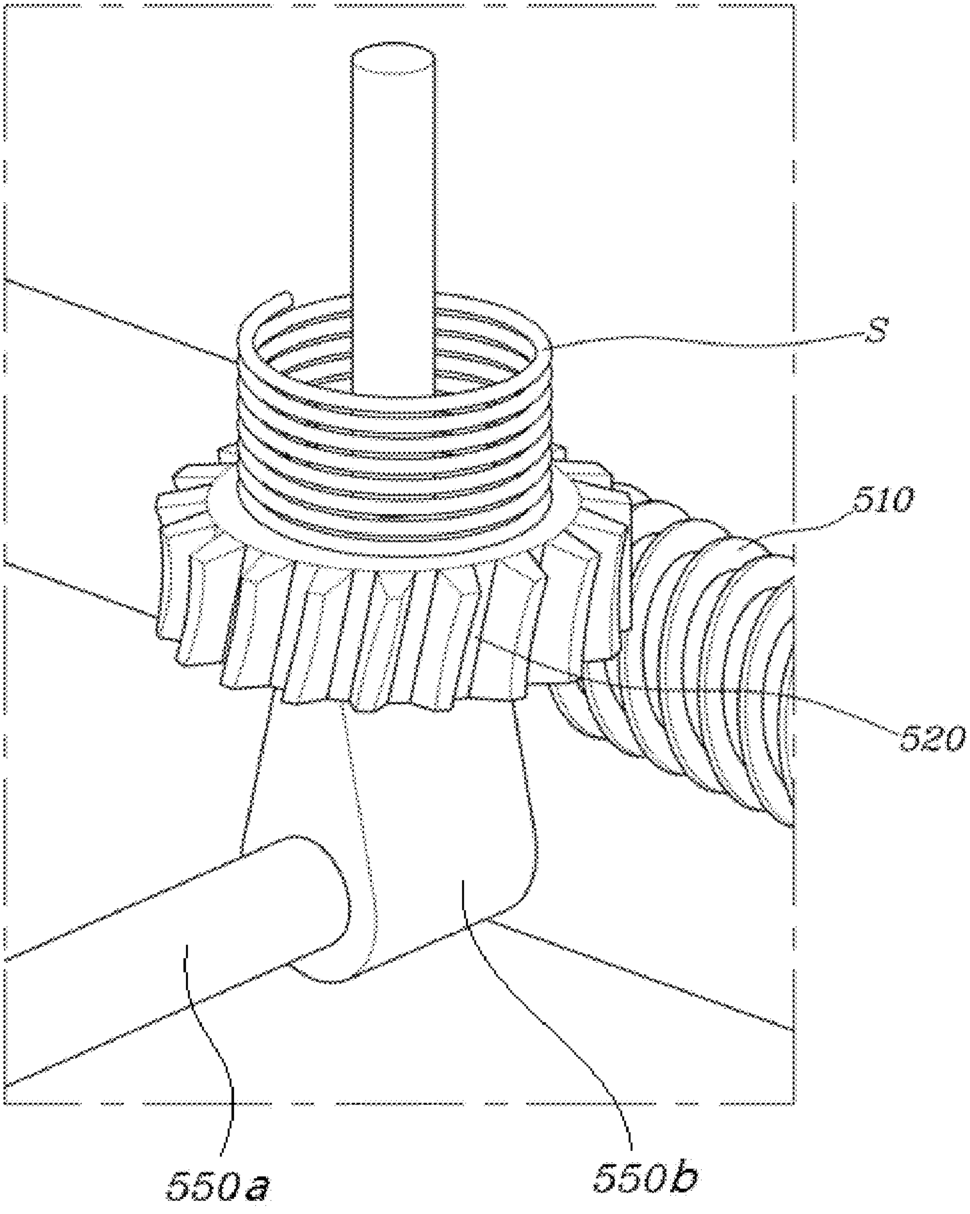

FIGS. 6 to 8 are diagrams showing an operation of the vehicle door hinge apparatus using an actuator according to the embodiment of the present disclosure.

First, referring to FIG. 6, the actuator 500 may include an arm 510 and a gear 520. The arm 510 may be connected to one end of the door link 100, and the gear 520 may be connected to the arm 510 so as to allow the arm 510 to move through rotation thereof. For example, a thread may be formed on the arm 510, and the gear 520 may be connected to a threaded area of the arm 510. Accordingly, the arm 510 may move forwards or rearwards by rotation of the gear 520 and, as such, one end of the door link 100 connected to the arm 510 may move forwards and rearwards along the door link guide 300.

A movement amount of the door link 100 may be adjusted depending on adjustment of a movement amount of the arm 510. Accordingly, it is possible to adjust a degree of opening of the door. To this end, the actuator 500 may further include a Hall sensor 530. Here, the Hall sensor 530 may control the movement amount of the arm 510.

Meanwhile, the actuator 500 may include a switch part 540 capable of performing switching so that the door is opened automatically or manually. The switch part 540 may be provided on the interior side of a vehicle and may be operated by a passenger. An internal operation of the actuator 500 according to an operation of the switch part 540 will be described with reference to FIGS. 7 and 8.

FIG. 7 is a diagram showing the interior of the actuator 500 in a state in which the door is automatically opened by the operation of the switch part 540.

Referring to FIG. 7, it may be seen that the arm 510 and the gear 520 are connected to each other when the door is automatically opened. In addition, an operation part 550 may be provided at a lower portion of the gear 520. For example, the operation part 550 may include a shaft 550*a* directly connected to the switch part 540 and a cam 550*b* provided at an end of the shaft 550*a*. When there is no interference between the operation part 550 and the gear 520, the gear 520 may be constantly connected to the arm 510, thereby automatically opening the door.

However, in case of an emergency situation that requires manual operation by a user, the switch part 540 is operated to switch to a state in which the door is manually opened. Referring to FIG. 8, when the door is manually opened, the cam 550*b* of the operation part 550 is rotated to move the gear 520 upwards. As a result, a connection between the gear 520 and the arm 510 may be released. Additionally, when the gear 520 moves upwards by the operation of the operation part 550, a spring S located above the gear 520 may be compressed.

When the emergency situation is released, the switch part 540 may be operated again to switch to a state in which the door is automatically opened. Accordingly, force generated by the operation part 550 and applied to the gear 520 may be eliminated, and the spring S compressed above the gear

520 may be restored by elastic force, thereby allowing the gear 520 to return to the original position thereof.

However, this structural configuration is an example, and the present disclosure is not necessarily limited thereto.

Figure 9:
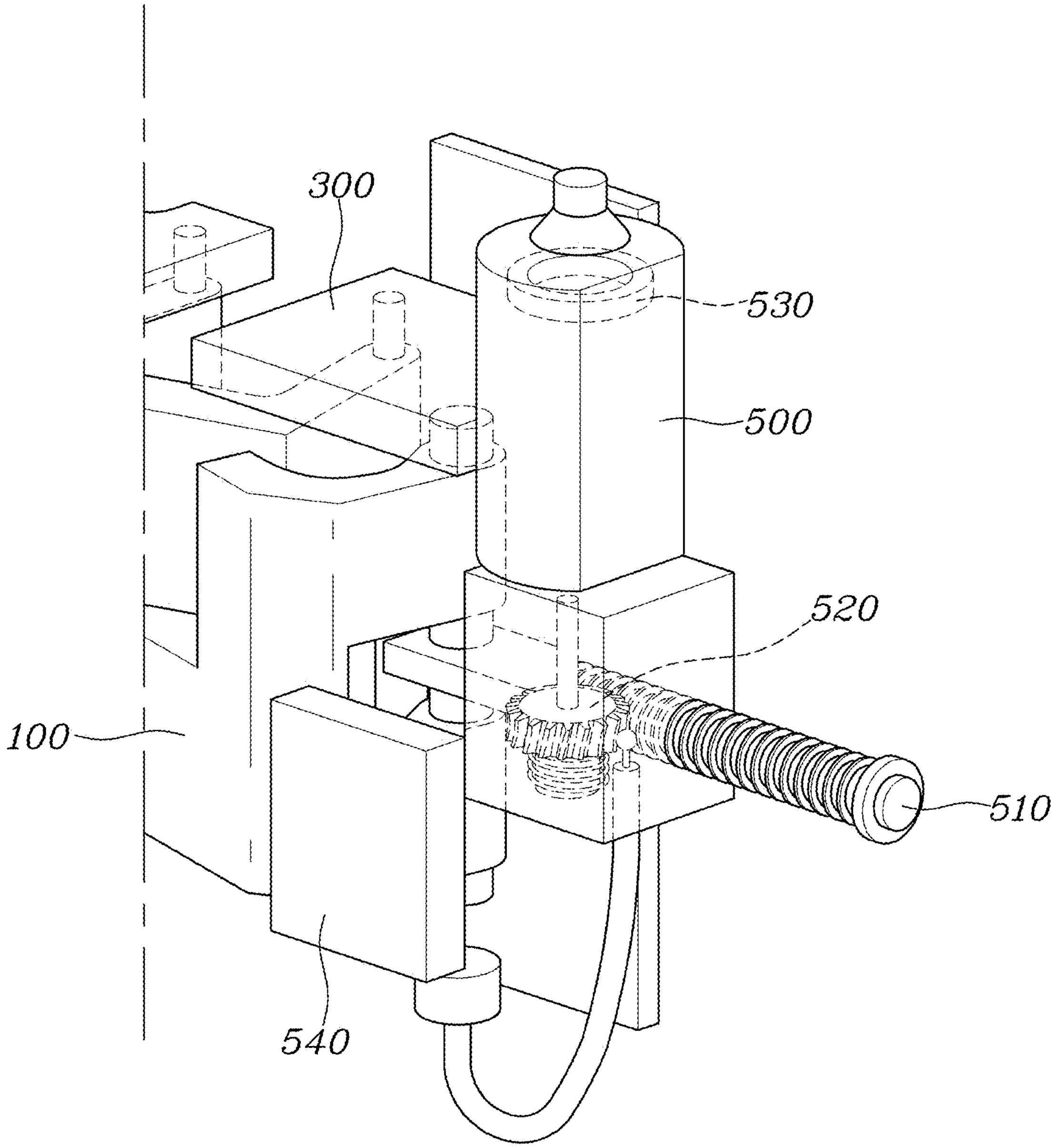
FIGS. 9, 10, and 11 are diagrams showing an operation of a vehicle door hinge apparatus using an actuator according to another embodiment of the present disclosure.
Figure 10:
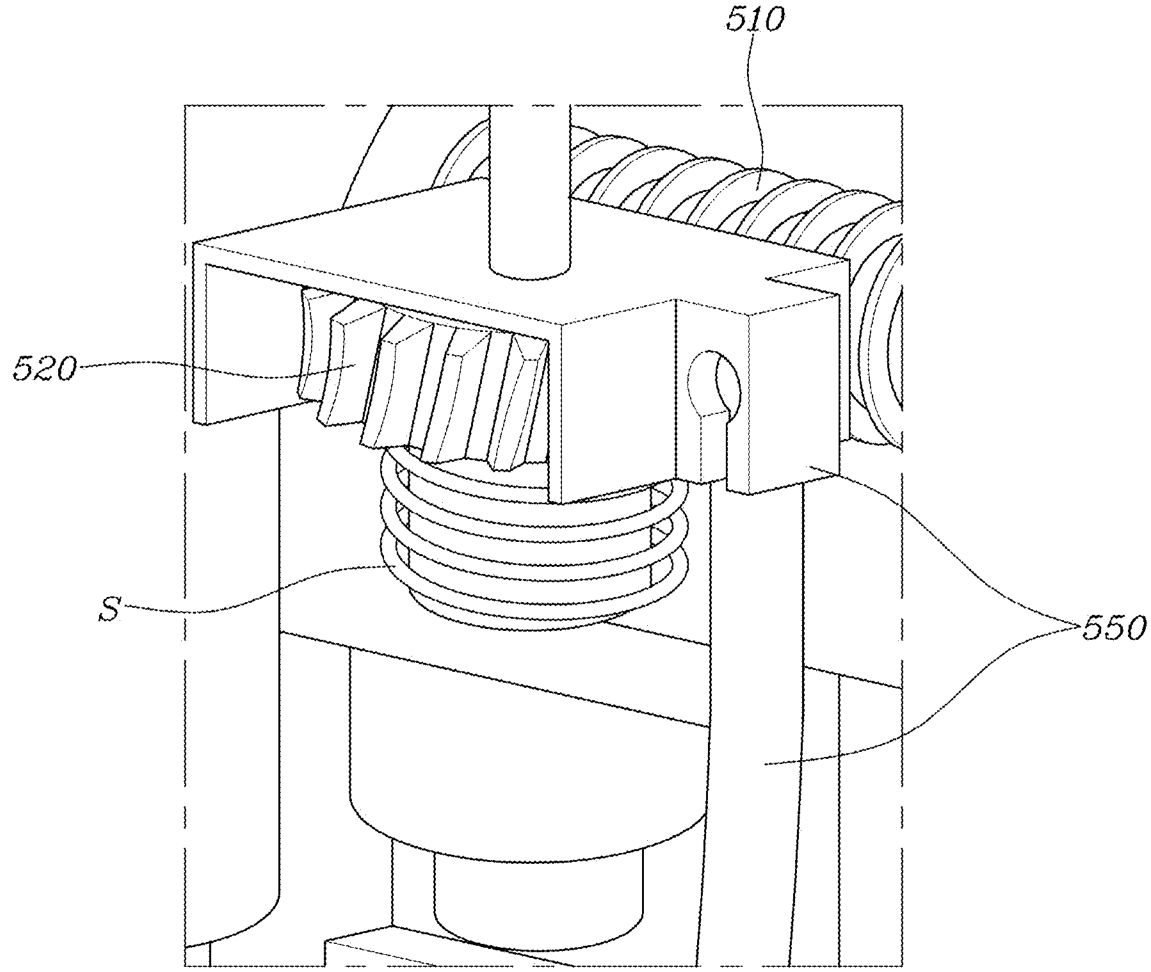
Figure 11:
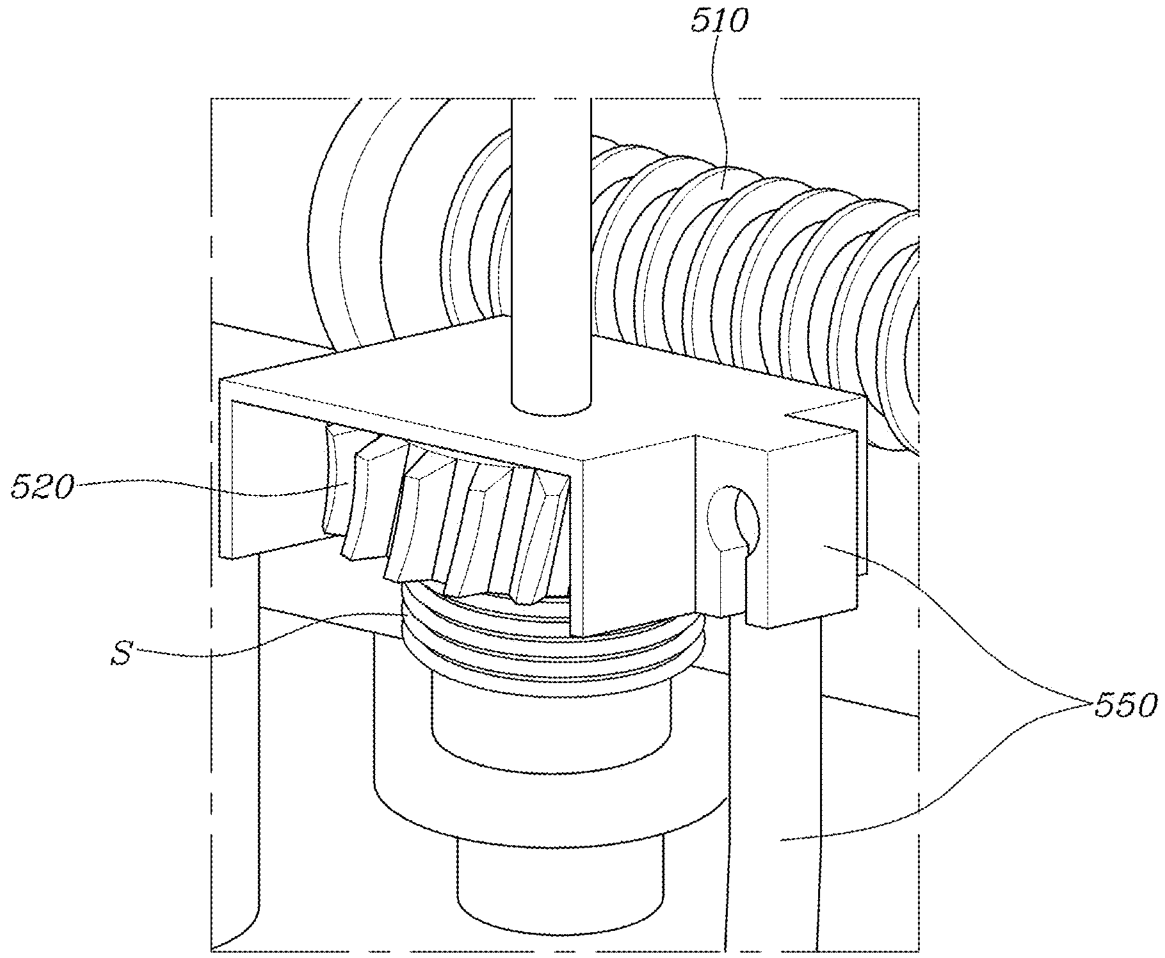

For example, FIGS. 9 to 11 are diagrams showing an operation of a vehicle door hinge apparatus using an actuator according to another embodiment of the present disclosure.

Referring to FIG. 9, according to another embodiment, the operation part 550 may be formed of a carrier and a wire. In this case, the wire may be wound around the switch part 540, and the carrier may be moved while the wound wire is unwound or the wire is wound around the switch part 540 by the operation of the switch part 540.

Referring to FIGS. 10 and 11, according to another embodiment, the operation part 550 may be located at an upper portion of the gear 520. In a state in which a door is manually opened due to an emergency situation, the operation part 550 may apply force from the upper portion of the gear 520 to the lower portion thereof, thereby releasing a connection between the gear 520 and the arm 510. Further, the spring S is provided at the lower portion of the gear 520 so that the spring S is compressed by the operation of the operation part 550. When the emergency situation is released and the door is automatically opened, force applied to the operation part 550 is released. As a result, the compressed spring S is restored by elastic force, and the gear 520 that has moved downwards may be moved upwards again so that the gear 520 is connected to the arm 510.

According to the above-described structural configuration, the vehicle door hinge apparatus of the present disclosure enables a door to be fully opened, thereby improving a feeling of openness of a vehicle using the door or other spaces connected to the vehicle.

In addition, a door hinge is not exposed to the outside when the door is closed or opened, thereby securing marketability of a vehicle exterior design.

In addition, since an operation part is provided on an actuator, an operation method of opening and closing the door may be easily changed in the event of an emergency situation, and the vehicle door hinge apparatus may be smoothly operated by the operation method.

As is apparent from the above description, the present disclosure provides a vehicle door hinge apparatus configured to allow a door to be fully opened, thereby making it possible to improve a feeling of openness of a vehicle using the door or other spaces connected to the vehicle.

In addition, a door hinge is not exposed to the outside when the door is closed or opened, thereby making it possible to secure marketability of a vehicle exterior design.

Furthermore, since an operation part is provided on an actuator, an operation method of opening and closing the door may be easily changed in the event of an emergency situation, and the vehicle door hinge apparatus may be smoothly operated by the operation method.

The effects of the present disclosure are not limited to the above-mentioned effects, and other effects not mentioned herein will be clearly understood by those skilled in the art from the detailed description of the embodiments.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

Accordingly, the above detailed description should not be interpreted in all respects in a limited manner and should be considered illustrative. The scope of the present disclosure should be determined by reasonable interpretation of the appended claims, and all modifications within the equivalent scope of the present disclosure are included within the scope of the present disclosure.

The invention claimed is:

1. A vehicle door hinge apparatus for a door of a vehicle comprising:

a door link having a first end pivotably and slidably connected to a vehicle body side and a second end hinged to a door side;

a vehicle body link having a first end pivotably and slidably connected to the door side and a second end hinged to the vehicle body side;

a door link guide positioned on the vehicle body side and configured to guide sliding of the first end of the door link;

a vehicle body link guide positioned on the door side and configured to guide sliding of the first end of the vehicle body link; and an actuator connected to the first end of the door link and configured to move the first end of the door link to allow the first end of the door link to slide along the door link guide;

wherein the door link and the vehicle body link intersect at an intersection point, the intersection point is hinged, and the door link and the vehicle body link are configured to perform, when the door of the vehicle is opened, a scissors motion around the hinged intersection point;

wherein the actuator comprises an arm and a gear, the arm of the actuator is connected to the first end of the door link and the gear of the actuator is connected to the arm to move the arm through rotation; and wherein, an operation part is located at an upper portion or a lower portion of the gear and includes a shaft connected to a switch part and a cam provided at an end of the shaft, when an emergency situation occurs, the gear is separated from the arm through the cam of the operation part, and a connection between the gear and the arm is released such that a manual operation is performable, and wherein, when the emergency situation ends, the gear is connected to the arm again through the cam of the operation part such that the manual operation is not performable.

2. The vehicle door hinge apparatus according to claim 1, wherein the door link and the vehicle body link intersect each other so as to partially overlap each other in a vertical direction, and the intersection point is hinged by a pin configured to penetrate the door link and the vehicle body link in the vertical direction.

3. The vehicle door hinge apparatus according to claim 1, wherein the second end of the door link and the second end of the vehicle body link face each other and are adjacent to each other, and the first end of the door link and the first end of the vehicle body link are spaced apart from each other in opposite directions.

4. The vehicle door hinge apparatus according to claim 1, wherein the door link comprises a link body including a first bent portion bent at a first end of the link body and a second bent portion bent at a second, opposite end of the link body, wherein a first end of the first bent portion on a first side of the door link is pivotally and slidably connected to the vehicle body side, and a first end of the second bent portion on a second side of the door link is hinged to the door side.

5. The vehicle door hinge apparatus according to claim 4, wherein the second end of the door link is disposed toward an outside of the vehicle with respect to the first end of the door link, such that the link body of the door link is obliquely disposed.

6. The vehicle door hinge apparatus according to claim 1, wherein the vehicle body link comprises a link body including a first bent portion bent at a first end of the link body and a second bent portion bent at a second, opposite end of the link body, wherein a first end of the first bent portion on a first side of the vehicle body link is pivotably and slidably connected to the door side, and a first end of the second bent portion on a second side of the vehicle body link is hinged to the vehicle body side.

7. The vehicle door hinge apparatus according to claim 6, wherein the second end of the vehicle body link is disposed toward an outside of the vehicle with respect to the first end of the vehicle body link, such that the link body of the vehicle body link is obliquely disposed.

8. The vehicle door hinge apparatus according to claim 1, wherein each of the door link guide and the vehicle body link guide has a sliding groove formed therein, wherein each of the sliding grooves extends in a forward-and-rearward direction of the vehicle in a closed state of the door.

9. The vehicle door hinge apparatus according to claim 8, wherein, in the closed state of the door, the first end of the door link is located at a front portion of the respective sliding groove, and the first end of the vehicle body link is located at a rear portion of the respective sliding groove.

10. The vehicle door hinge apparatus according to claim 9, wherein, in an opened state of the door, the first end of the door link slides from the front portion of the respective sliding groove to a rear portion thereof along the respective sliding groove, and the first end of the vehicle body link slides from the rear portion of the respective sliding groove to a front portion thereof along the respective sliding groove.

11. The vehicle door hinge apparatus according to claim 10, wherein, in a fully opened state of the door, the first end and the second end of the door link or the first end and the second end of the vehicle body link are located on the same line, each of the door link and the vehicle body link comprises a link body, and the link body of the door link and the link body of the vehicle body link overlap.

12. The vehicle door hinge apparatus according to claim 1, wherein, in a closed state of the door, the first end of the door link and the second end of the vehicle body link are located on an inner side of a vehicle body and the second end of the door link and the first end of the vehicle body link are located on an inner side of the door such that the door link and the vehicle body link are not exposed to an outside of the vehicle body or the door.

* * * * *